(12) United States Patent
Peterson et al.

(10) Patent No.: US 6,598,015 B1
(45) Date of Patent: Jul. 22, 2003

(54) CONTEXT BASED COMPUTER-ASSISTED LANGUAGE TRANSLATION

(75) Inventors: Steve Peterson, Oakland, CA (US); Malcolm Ishida, Berkeley, CA (US); Mark Bradin, San Francisco, CA (US); Michael Petrotta, San Francisco, CA (US); Douglas Pearson, Oakland, CA (US)

(73) Assignee: RWS Group, LLC, San Francisco, CA (US)

(*) Notice: Subject to any disclaimer, the term of this patent is extended or adjusted under 35 U.S.C. 154(b) by 0 days.

(21) Appl. No.: 09/394,177

(22) Filed: Sep. 10, 1999

(51) Int. Cl.[7] ............................................. G06F 17/28
(52) U.S. Cl. ................................. 704/3; 704/5
(58) Field of Search ........................... 704/2, 3, 4–7, 704/277; 707/530, 536, 517, 529; 379/88.05, 88.06

(56) References Cited

U.S. PATENT DOCUMENTS

| | | | | |
|---|---|---|---|---|
| 5,442,546 A | * | 8/1995 | Kaji et al. | 704/2 |
| 5,535,120 A | * | 7/1996 | Chong et al. | 704/2 |
| 5,548,508 A | * | 8/1996 | Nagami | 704/2 |
| 5,587,902 A | * | 12/1996 | Kugimiya | 704/5 |
| 5,608,622 A | * | 3/1997 | Church | 704/7 |
| 5,724,593 A | * | 3/1998 | Hargrave, III et al. | 704/2 |
| 5,751,057 A | * | 5/1998 | Palagonia | 704/3 |
| 5,848,386 A | * | 12/1998 | Motoyama | 704/5 |
| 5,987,402 A | * | 11/1999 | Murata et al. | 704/2 |
| 6,092,035 A | * | 7/2000 | Kurachi et al. | 704/3 |
| 6,243,669 B1 | * | 6/2001 | Horiguchi et al. | 704/9 |

OTHER PUBLICATIONS

Kuikka, E., et al., "Transformation of structured documents," Electronic Publishing, vol. 8(4), pp. 319–341, Dec. 1995.

Christa Degnan, *Lingua franca of cost savings*, Jul. 12, 1999, PC Week Online, 3 pgs., http//web.archive.org/web/19991128141155/www.zdnet.com/pcweek/stories/news/0,4153,409214,00.html.

Vizard & Schwarts, *Uniscape to Use Internet to Overcome Language Barriers*, Jul. 12, 1999 (vol. 21, Issue 28), Info World.com, 2 pgs., http://web.archive.org/web/20000307043718/www.infow....com/cgi-bin/displayArchive.pl?/99/28/t12-28.14.htm.

Mel Duvall, *Translating Web Documents Into Dollars*, Jul. 14, 1999, ZDNet Interactive Week, 2 pgs., http://web.archive.org/web/19991127103449/www.zdnet.com/intweek/stories/news/0,4164,2292786,00.html.

Poulus & Schwartz, *E–Commerce in any Language: New Translation Web Portal Guarantees 20 Percent Savings*, Jul. 19, 1999, Uniscape.com, 3 pgs., http://web.archive.org/web/20000816094727/www.uni...pe.com/news/pressreleases/pressroom_21_july19.html.

* cited by examiner

Primary Examiner—Patrick N. Edouard
(74) Attorney, Agent, or Firm—Fish & Richardson P.C.

(57) ABSTRACT

The invention features systems and methods of assisting a translation of an original document from an original language into a translation language that provide enhanced opportunities to leverage previously translated documents and that provide linguists with greater context to improve the efficiency and quality of the resulting translations. In addition, the invention features a network-based document management system that provides enhanced document and project management capabilities. In one aspect, a format structure of the original document is extracted as a tree structure of one or more nodes identifying text and formatting codes in the original document. In another aspect, the original document is stored on a server coupled to a network, a remote user may display selected portions of the original document on a remote network terminal, and the remote user may create a translation language document on the server.

23 Claims, 6 Drawing Sheets

```
<Doc>
        text 1
        <A>
                text 2
                <B>
                text 3
        </A>
        text 4
        <C>
                text 5
        </C>
</Doc>
```

CONTEXT BASED COMPUTER-ASSISTED LANGUAGE TRANSLATION

BACKGROUND OF THE INVENTION

The invention relates to computer-assisted language translation systems and methods.

The translation of a document from one language into another often is performed by a linguist (or translator). Recently, computer systems have been used to assist linguists in translating documents. For example, some computer systems include a translation memory configured to assist in the translation of portions of a document based upon previously translated documents. A translation memory is a database that collects translations as they are performed along with the original language documents on which the collected translations are based. When one or more portions of a document being translated match portions of a previously translated document, corresponding portions of the counterpart translation language document may be used to assist a linguist in translating the document. Translation memory systems increase the translation efficiency of linguists by enabling the linguist to avoid re-translating the portions of a document that have been previously translated.

Each document to be translated contains text to be translated and formatting codes that control the way in which the text is formatted. Some prior translation memory systems separate document text from document formatting codes for matching purposes, and present only the document text fragments to linguists for translation. Such an approach, however, may result in the presentation of text fragments that lack the context that would be provided if the text were formatted properly.

SUMMARY OF THE INVENTION

The invention features systems and methods of assisting a translation of an original document from an original language into a translation language that provide enhanced opportunities to leverage previously translated documents and that provide linguists with the context needed to improve the efficiency and quality of the resulting translations. In addition, the invention features a network-based document management system that provides enhanced document and project management functionality.

In one aspect of the invention, a format structure of the original document is extracted as a tree structure of one or more nodes identifying text and formatting codes in the original document.

In another aspect of the invention, the original document is stored on a server coupled to a network, a remote user may display selected portions of the original document on a remote network terminal, and the remote user may create a translation language document on the server.

Embodiments may include one or more of the following features.

The original document format structure may be extracted by establishing parent-child relationships among formatting code nodes and text nodes, wherein a parent node identifies a formatting code that applies to document content identified by each child node subordinate to that parent node. Document content identified by all of the child nodes subordinate to a particular parent node may be simultaneously displayed.

Document content preferably is expressed in a computer-readable mark-up language.

In one embodiment, potential opportunities to leverage one or more portions of a second original-language document having a counterpart translation language document are identified to assist in translating the original document. The second original-language document preferably has an associated extracted tree structure, in which case potential leveraging opportunities are identified by identifying one or more matching portions of the tree structures extracted from the original document and the second original-language document. Potential leveraging opportunities are identified by performing a depth-first traversal through the tree structure extracted from the original document. Potential leveraging opportunities are identified by comparing document content identified by nodes of the tree structures extracted from the original document and the second original-language document. Portions of the counterpart translation language document corresponding to the one or more identified portions of the second original-language document matching corresponding portions of the original document also are identified. Identified potential leveraging opportunities are displayed.

Document content preferably is displayed in accordance with the tree structure extracted from the original document. A graphical user interface preferably is provided for simultaneously displaying on the remote network terminal user selected portions of the original document and corresponding portions of the translation language document created by the user on the server. Potential opportunities to leverage one or more portions of a previously created translation language document preferably also is displayed on the remote network terminal. One or more authorized users may create one or more modified versions of the translation language document created on the server.

The language translation system preferably is implemented as a JAVA® computer program application.

As used herein, the term "document content" refers to all of the contents of a document, including text and formatting codes.

Among the advantages of the invention are the following.

The invention provides enhanced opportunities to leverage previously translated documents by maintaining the context provided by the formatting code nodes within a tree structure that is extracted from a document to be translated. Also, the invention provides linguists with greater context by displaying properly formatted text, thereby improving the efficiency and quality of the resulting translations. Furthermore, the invention provides enhanced document and project management capabilities by maintaining documents at a single location which is accessible by a plurality of remote users. One embodiment of the invention is implemented as a JAVA® computer program application and, therefore, users may interact with the language translation system with only a web browser and a computer network connection; a separate computer program does not have to be loaded onto a user's network terminal.

Other features and advantages will become apparent from the following description, including the drawings and the claims.

DESCRIPTION OF THE PREFERRED EMBODIMENTS

Figure 1:
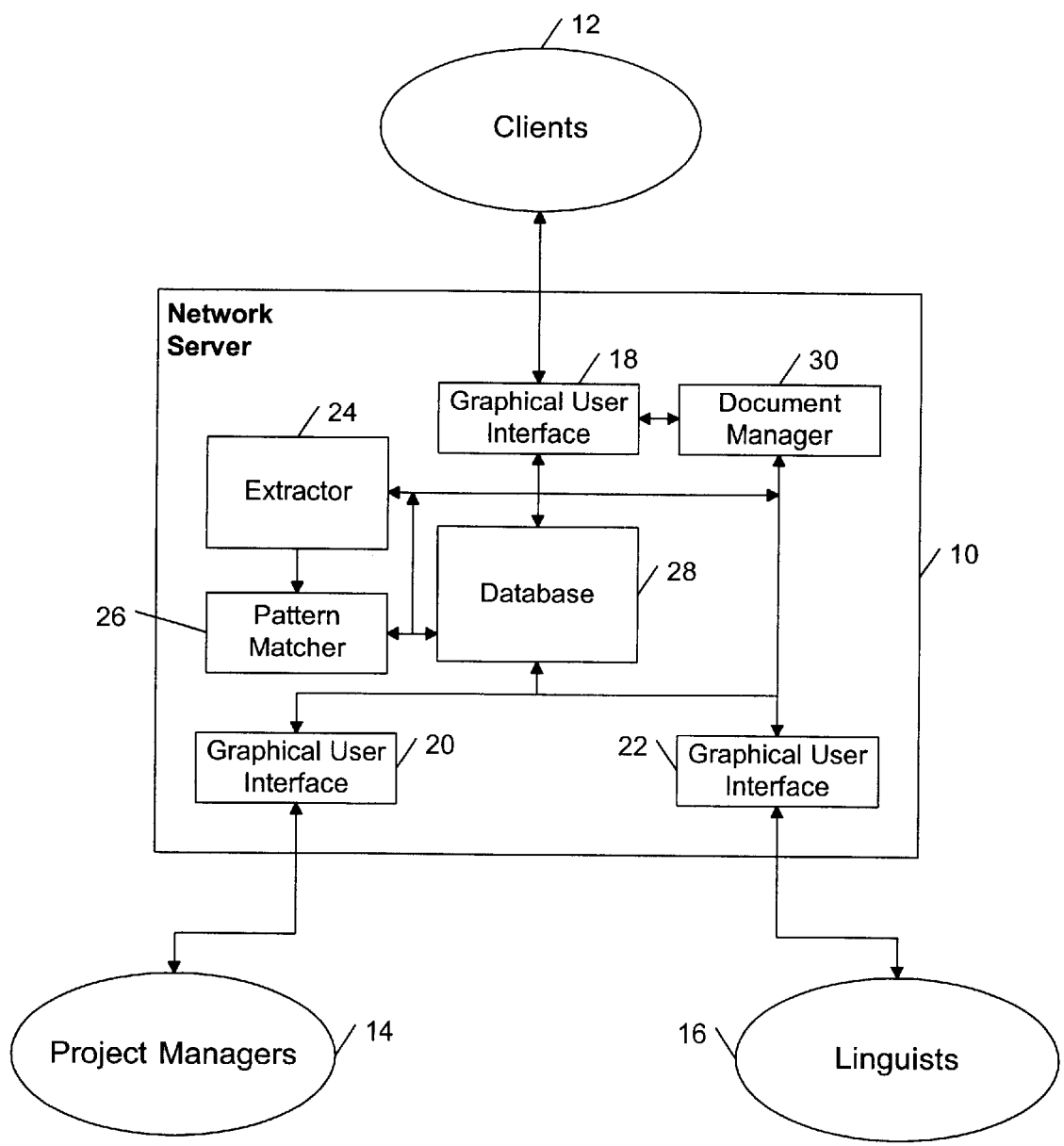
FIG. 1 is a block diagram of a system for assisting a translation of an original document from an original language into a translation language.

Referring to FIG. 1, a system for assisting a translation of an original document from an original language into a translation language includes a network server 10 which is accessible by one or more clients 12, one or more project managers 14 and one or more linguists 16 over a computer network (e.g., the Internet). Network server 10 includes graphical user interfaces 18, 20 and 22 that enable clients 12, project managers 14 and linguists 16 to interact with the system. Graphical user interfaces 18–22 are configured to be displayed on a web browser that includes an applet-based platform (e.g., a JAVA® platform that supports JAVA® computer program applications) and to enable users to upload information to and download information from network server 10. Graphical user interfaces 18–22 may require users to enter identification information, including a password, before access to network server 10 is granted. Network server 10 also includes an extractor 24, a pattern matcher 26, a database 28, and a document. manager 30. Extractor 24 is configured to extract statistical information and a format structure from a document to be translated. Pattern matcher 26 is configured to identify potential opportunities to leverage one or more portions of previously translated documents, which are stored in database 28, based upon the document format structure extracted by extractor 24. Database 28 is configured to store previously translated documents and their translation language counterparts, as well as documents being translated and other documents used to assist in the translation process. Document manager 30 is configured to coordinate the language translation process (e.g., different versions of the translation language document).

Figure 2:
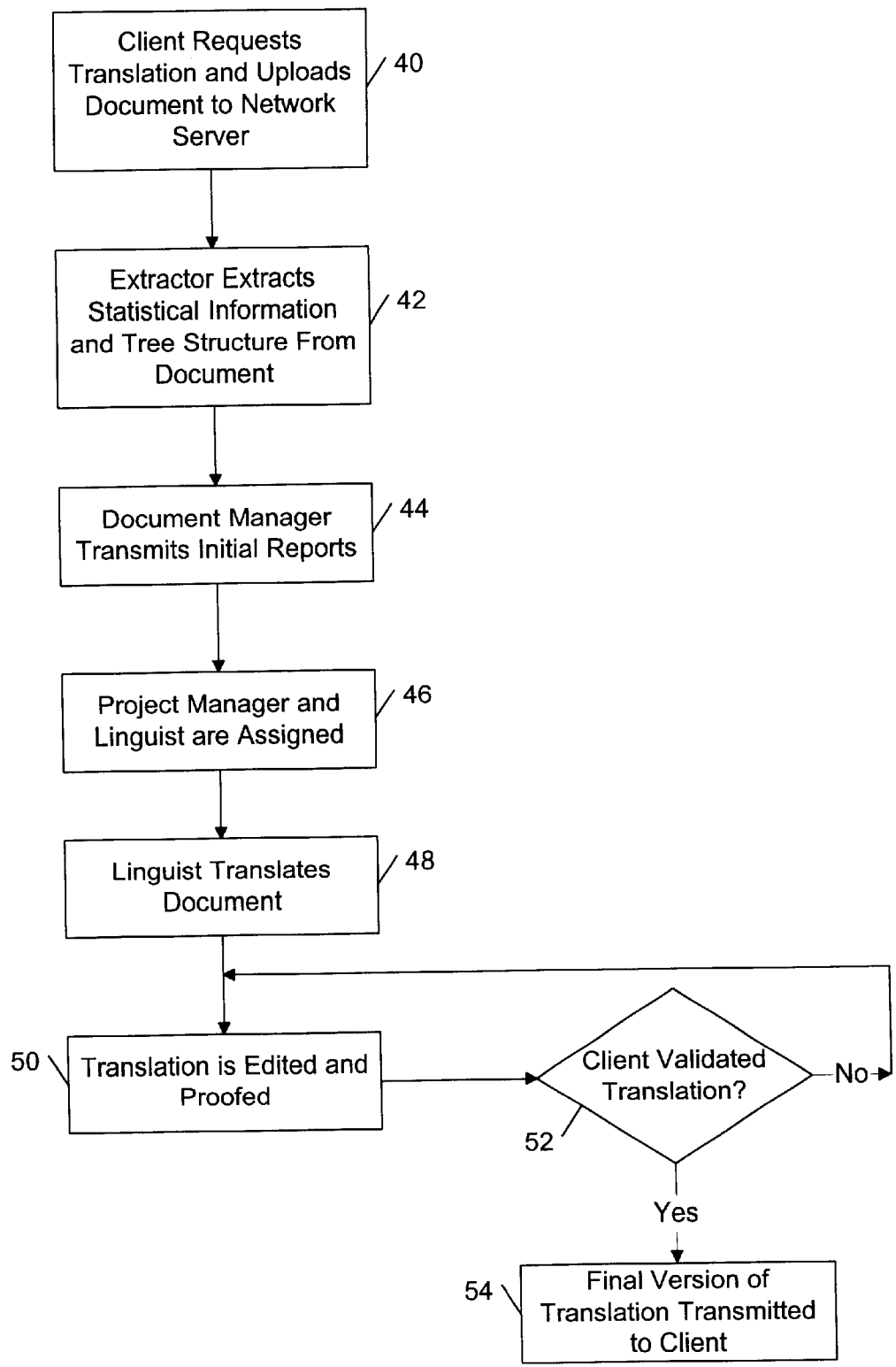
FIG. 2 is a flow diagram of a method of managing the process of translating a document from an original language into a translation language.

Referring to FIG. 2, in one embodiment, document manager 30 may coordinate the language translation process as follows. The process is initiated when a client accesses network server 10, requests a translation and uploads the original document to be translated onto network server 10 (step 40). Extractor 24 extracts statistical information (e.g., word count) and a format structure from the original document (step 42). Document manager 30 receives statistical information from extractor 24 and leveraging information from pattern matcher 26 (e.g., a measure of the opportunity to leverage previously translated documents stored in database 28), and transmits this information to clients 12, projects managers 14 and linguists 16 (step 44). These transmissions may be in the form of electronic mail (e-mail) reports sent over the network, or in the form of bulletin board (in-box) postings accessible through graphical user interfaces 18–22. A project manager and a linguist are then assigned to translate the document (step 46). Project managers and linguists may be assigned automatically based upon workload and relevant expertise, or may be assigned based upon the results of a bidding process. At this point, the assigned linguist translates the document from the original language into the requested translation language (step 48). After the document has been translated by the linguist, the translation language document is edited and proofed (step 50); this process may be performed by the project manager or by another linguist. The edited and proofed document is transmitted to the client for validation. If the client validates the translation (step 52), a final version of the translation is transmitted to the client (step 54); otherwise, the document is further edited and proofed (step 50) until the client validates the translation (step 52).

Document manager 30 may maintain a list of the different versions of the translation language document throughout the translation process. Also, document manager 30 may be configured to transmit statistical and confirmation reports to the client and to the project manager after each stage of the translation process has been completed.

Figures 3A, 3B:
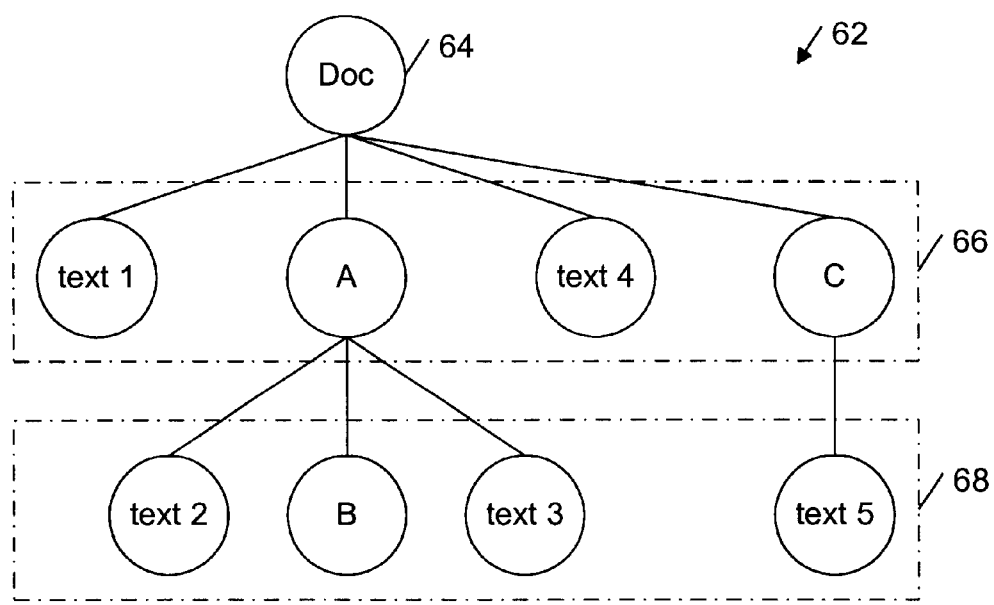
FIG. 3A is a diagrammatic view of a format structure of an original language document.
FIG. 3B is a diagrammatic view of a tree structure extracted from the original language document of FIG. 3A.

As shown in FIG. 3A, each document that is uploaded by a client for translation has a coded format structure that includes text blocks and formatting codes. The formatting codes include codes that control the format (e.g., font, font attributes, line spacing; indentation) of the text blocks and codes that identify special characters. In document 60, the "Doc" formatting code affects the format of each of the text blocks text 1, text 2, text 3, text 4 and text 5 and the format of special character "B." The "A" formatting code affects the format of text 2, special character "B" and text 3. The formatting code "C" affects the format of text 5. Documents may be coded in a computer-readable mark-up language (e.g., XML, SGML, HTML, X-HTML, MIF and RTF mark-up language formats).

Referring to FIG. 3B, extractor 24 extracts the format structure of document 60 as a tree structure 62 of nodes identifying text and formatting codes. The nodes of the extracted tree structure are organized with parent-child relationships that reflect the nested format structure of the document. The Doc formatting code, which affects the format of the entire document, forms a root node 64 of tree structure 62; each of the other nodes is subordinate to the Doc node. The nodes text 1, A, text 4 and C form a first level 66 of tree structure 62 because these nodes are affected only by the Doc formatting code. The nodes text 2, B, text 3 and text 5 form a second level 68 of tree structure 62 because these nodes are affected by two formatting codes: text 2, B and text 3 are affected by the Doc and A formatting codes; and text 5 is affected by the Doc and C formatting codes.

Figure 4:
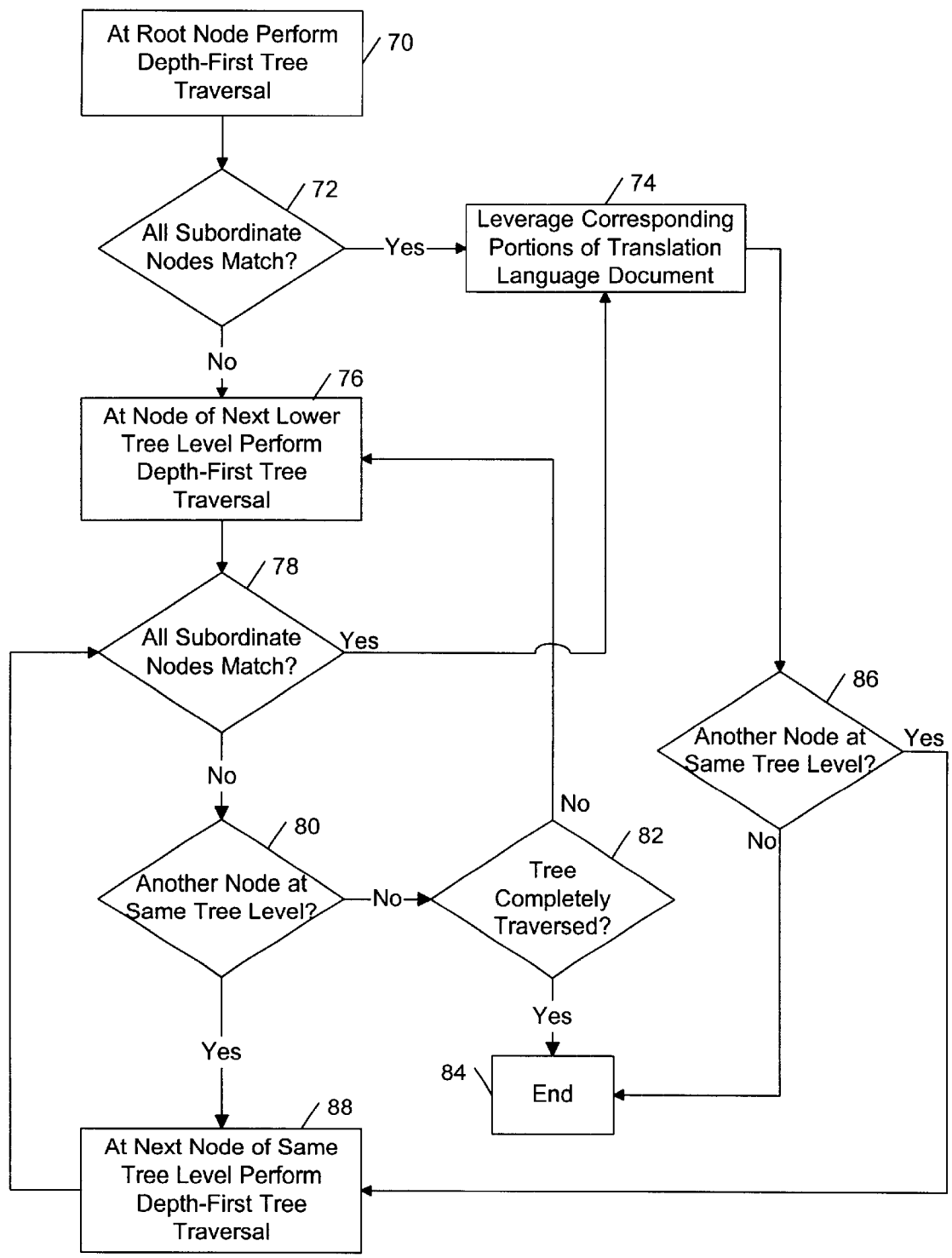
FIG. 4 is a flow diagram of a method of identifying potential opportunities to leverage one or more portions of a previously translated document to assist in translating another document.

Referring to FIG. 4, in one embodiment, pattern matcher 26 may identify potential opportunities to leverage one or more portions of previously translated documents which are stored in database 28 based upon tree structure 62 which is extracted from original language document 60 as follows. At root node 64, pattern matcher 26 performs a depth-first traversal through extracted tree structure 62 and compares each subordinate node to the nodes of previously translated original language documents (step 70). In accordance with a depth-first tree traversal, pattern matcher 26 proceeds from the end of the tree structure that corresponds to the beginning of the document (i.e., the left side of tree structure 62) to the end of the tree structure that corresponds to the end of the document (i.e., the right side of tree structure 62) and begins with the lowest level node for each lateral node position. In this way, pattern matcher 26 traverses the nodes of the tree structure in an order that corresponds to the order in which the nodes appear in the original document. Thus, pattern matcher 26 begins with text 1 node, then proceeds to nodes text 2, B, text 3 and A (in that order), followed by the text 4 node, the text 5 node, and the C node.

If all of the nodes which are subordinate to the root node match nodes in a previously translated document (step 72), pattern matcher identifies:the corresponding portions of the counterpart translation language document as potential leveraging opportunities (step 74). If all of the subordinate nodes do not match nodes in a previously translated document (step 72), pattern matcher 26 proceeds to the first node (i.e., text 1 in tree structure 62) in the next tree level (i.e., tree level 66) and performs a depth-first tree traversal through the sub-tree structure having that node as a root node (step 76). If all of the subordinate nodes of the sub-tree structure match nodes in a previously translated document (step 78), pattern matcher 26 identifies the corresponding portions of the counterpart translation language document as potential leveraging opportunities (step 74). Otherwise, pattern matcher 26 determines whether there are other nodes at the same tree level (i.e., tree level 66) (step 80). If there are no other nodes at that tree level (step 80) and the tree structure has been completely traversed (step 82), the process ends (step 84); if the tree has not been completely traversed (step 82), pattern matcher 26 proceeds to the first node in the next tree level (i.e., tree level 68) (step 76) and repeats the process. If there is another node at the same tree level (i.e., tree level 66) (steps 78, 86), performs a depth-first tree traversal through the sub-tree structure having that node as a root node (step 88) and repeats the subordinate node pattern matching process (step 78).

Figure 5A:
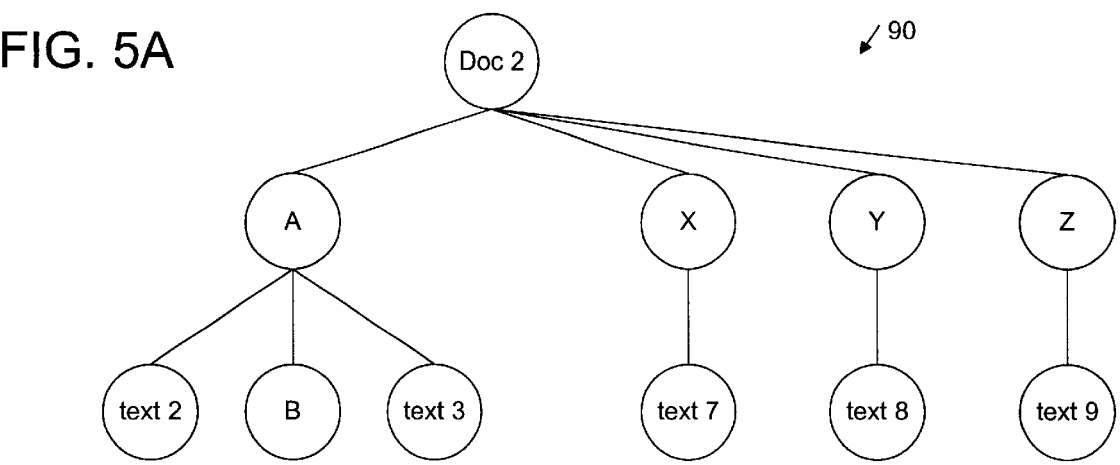
FIG. 5A is a diagrammatic view of a tree structure of a new original language document to be translated.
Figure 5B:
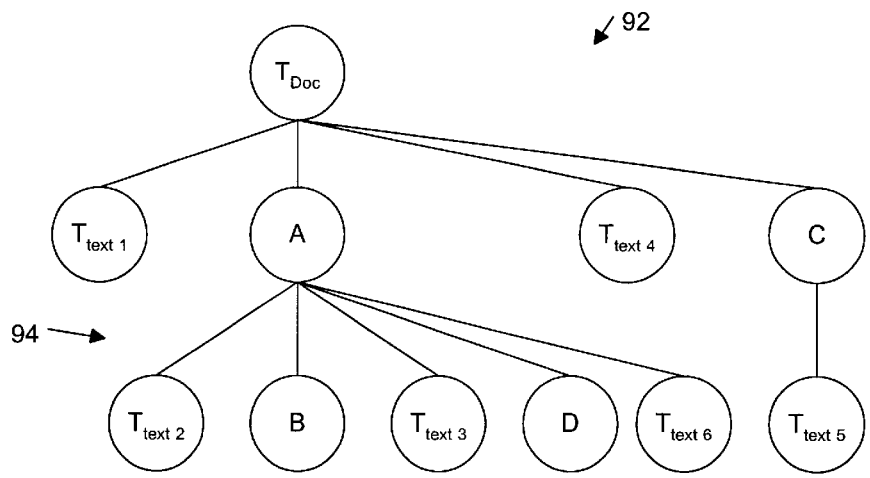
FIG. 5B is a diagrammatic view of a tree structure of the translation language counterpart of the original language document of FIG. 3A.
Figure 5C:
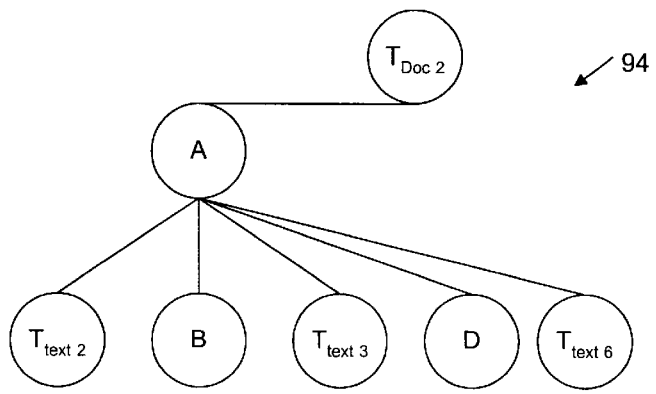
FIG. 5C is a diagrammatic view of a tree structure corresponding to the portion of the translation language document of FIG. 5A that may be leveraged to assist in the translation of the second original language document of FIG. 5B.

Referring to FIGS. 5A–5C, in a particular example, pattern matcher 26 may identify potential leveraging opportunities for a new original language document with an extracted tree structure 90 (FIG. 5A) as follows. In this example, it is assumed that original language document 60 has a counterpart translation language document with a tree structure 92 (FIG. 5B) both of which are stored in database 28. Pattern matcher 26 traverses the extracted tree structure 90 of the document to be translated and identifies a portion (nodes A, text 2, B and text 3) of extracted tree structure 90 that matches a portion of tree structure 62 of original language document 60. The portion 94 (FIGS. 5B, 5C) of the counterpart translation language document that corresponds to the identified matching portion of document 60 is presented to the linguist assigned to translate the new original language document as a potential leveraging opportunity.

Figure 6:
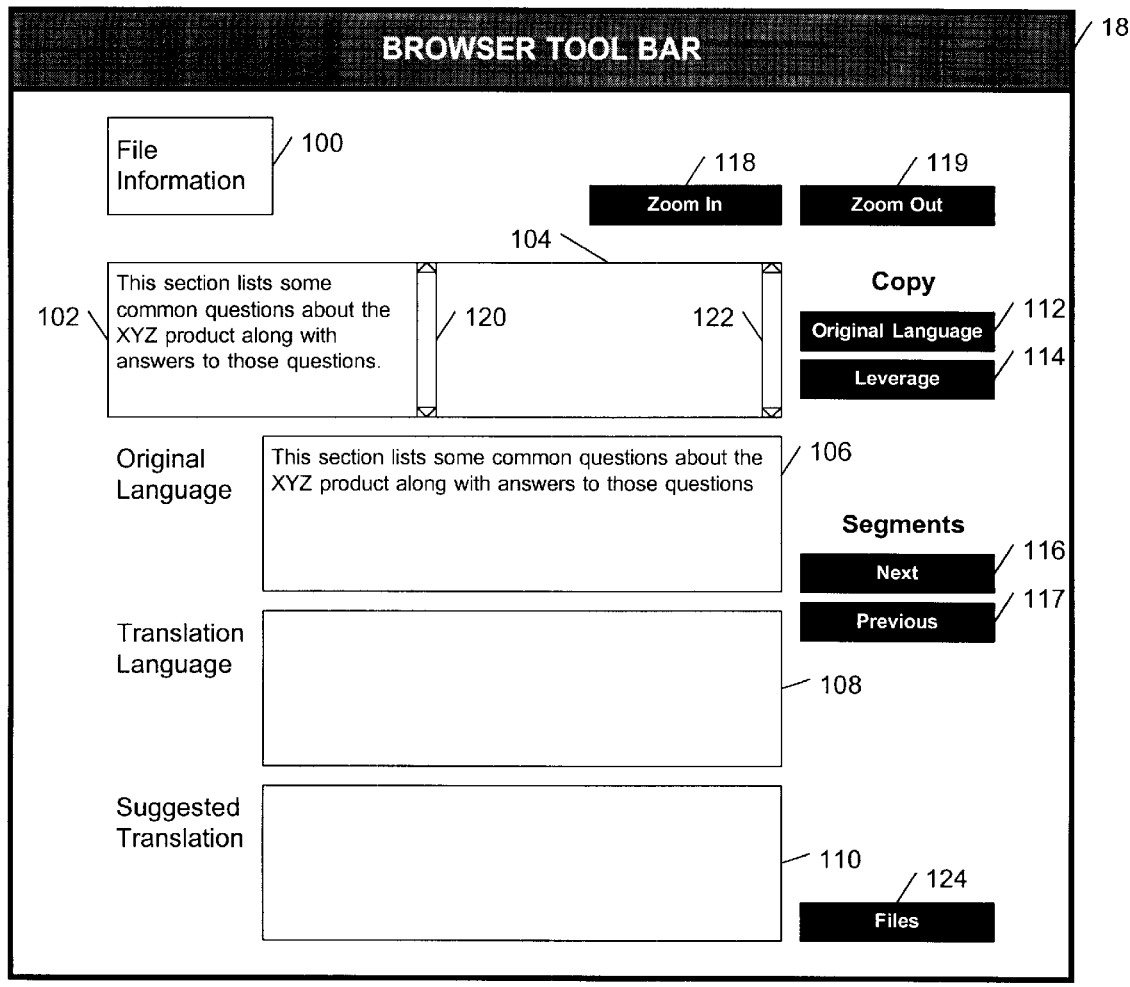
FIG. 6 is a diagrammatic view of a graphical user interface that may be accessed by a linguist to create a translation language document on a network server.

Referring to FIG. 6, a linguist who has been assigned to translate a document may create a translation language document on network server 10 by accessing graphical user interface 18 over a network. As explained above, graphical user interface 18 may be displayed in a browser computer application program (e.g., an HTML web browser, such as the Microsoft® Internet Explorer® web browser and the Netscape® web browser) running an applet plug-in (e.g., a JAVA® computer program application). Graphical user interface 18 includes a file identifier window 100 that contains information identifying the translation project, the translation document name, and the portion of the original language document that is currently displayed. The linguist may scroll through the text of the document to be translated in an original language text window 102. The corresponding translation language text is displayed in a window 104. The original language text is reproduced in an Original Language edit window 106, the linguist may enter translation language text in a Translation Language edit window 108, and potential leveraging opportunities identified by pattern matcher 26 are displayed in a Suggested Translation edit window 110. The linguist may copy portions (e.g., numbers or symbols which are the same in both the original language and in the translation language) of the original language text displayed in original language edit window 106 into the translation language document by selecting an Original Language icon 112. Alternatively, the linguist may copy the suggested translation language into the translation language document by selecting a leverage icon 114.

The linguist may scroll the sequential text segments of the original language document by activating scroll bars 120, 122 for the original language and translation text windows 102, 104. The linguist may view particular text segments by selecting Next segment and Previous segment icons 116, 117 which operate to display the text corresponding to nodes identified by forward and reverse depth-first tree traversals through the original language document to be translated, respectively. The linguist may display additional original language text by selecting a Zoom Out icon 118 which operates to display all of the text contained within the sub-tree portion having a root node that is one level higher than the text level currently displayed in original language text window 102. The linguist may return to the previous text view at the lower tree level by selecting a Zoom In icon 1 19. The linguist may access the files of another translation project by selecting a files icon 124.

Other embodiments are within the scope of the claims.

What is claimed is:

1. A method of assisting a translation of an original document from an original language into a translation language, comprising:

extracting a format structure of the original document as a tree structure of one or more nodes identifying text and formatting codes in the original document, formatting codes comprising codes that control the format of text, where the nodes of the extracted tree structure are organized with relationships that reflect a nested format structure of the original document; and using the tree structure to identify potential opportunities to leverage one or more portions of a second original-language document having a counterpart translation language document to assist in translating the original document, wherein the second original-language document has an associated extracted tree structure.

2. The method of claim 1, wherein extracting the original document format structure comprises establishing parent-child relationships among formatting code nodes and text nodes.

3. The method of claim 2, wherein a parent node identifies a formatting code that applies to document content identified by each child node subordinate to that parent node.

4. The method of claim 2, further comprising simultaneously displaying document content identified by all of the child nodes subordinate to a particular parent node.

5. The method of claim 1, wherein document content is expressed in a computer-readable mark-up language.

6. The method of claim 1, wherein potential leveraging opportunities are identified by identifying one or more matching portions of the tree structures extracted from the original document and the second original-language document.

7. The method of claim 6, wherein potential leveraging opportunities are identified by performing a depth-first traversal through the tree structure extracted from the original document.

8. The method of claim 6, wherein potential leveraging opportunities are identified by comparing document content identified by nodes of the tree structures extracted from the original document and the second original-language document.

9. The method of claim 6, further comprising identifying portions of the counterpart translation language document corresponding to the one or more identified portions of the second original-language document matching corresponding portions of the original document.

10. The method of claim 1, further comprising displaying identified potential leveraging opportunities.

11. The method of claim 1, further comprising displaying document content in accordance with the tree structure extracted from the original document.

12. A system for assisting a translation of an original document from an original language into a translation language, comprising:

a format structure extractor configured to extract a format structure of the original document as a tree structure of one or more nodes identifying text and formatting codes in the original document, formatting codes comprising codes that control the format of text, where the nodes of the extracted tree structure are organized with relationships that reflect a nested format structure of the original document; and a pattern matcher configured to use the tree structure to identify potential opportunities to leverage one or more portions of a second original-language document having a counterpart translation language document to assist in translating the original document, wherein the second original-language document has an associated extracted tree structure.

13. The system of claim 12, wherein the format structure extractor is configured to establish parent-child relationships among formatting code nodes and text nodes.

14. The system of claim 13, wherein a parent node identifies a formatting code that applies to document content identified by each child node subordinate to that parent node.

15. The system of claim 13, further comprising a graphical user interface configured to simultaneously display document content identified by all of the child nodes subordinate to a particular parent node.

16. The system of claim 12, wherein document content is expressed in a computer-readable mark-up language.

17. The system of claim 12, wherein potential leveraging opportunities are identified by identifying one or more matching portions of the tree structures extracted from the original document and the second original-language document.

18. The system of claim 17, wherein potential leveraging opportunities are identified by performing a depth-first traversal through the tree structure extracted from the original document.

19. The system of claim 17, wherein potential leveraging opportunities are identified by comparing document content identified by nodes of the tree structures extracted from the original document and the second original-language document.

20. The system of claim 17, wherein the pattern matcher is configured to identify portions of the counterpart translation language document corresponding to the one or more identified portions of the second original-language document matching corresponding portions of the original document.

21. The system of claim 12, further comprising a graphical user interface configured to display identified potential leveraging opportunities.

22. The system of claim 12, further comprising a graphical user interface configured to display document content in accordance with the tree structure extracted from the original document.

23. The system of claim 12, wherein the format structure extractor is implemented as a JAVA® computer program application.

* * * * *